United States Patent
Nakanishi

(10) Patent No.: US 7,460,058 B2
(45) Date of Patent: Dec. 2, 2008

(54) RADAR

(75) Inventor: Motoi Nakanishi, Nagaokakyo (JP)

(73) Assignee: Murata Manufacturing Co., Ltd. (JP)

( * ) Notice: Subject to any disclaimer, the term of this patent is extended or adjusted under 35 U.S.C. 154(b) by 2 days.

(21) Appl. No.: 11/934,254

(22) Filed: Nov. 2, 2007

(65) Prior Publication Data

US 2008/0094274 A1    Apr. 24, 2008

Related U.S. Application Data

(63) Continuation of application No. PCT/JP2006/308199, filed on Apr. 19, 2006.

(30) Foreign Application Priority Data

May 16, 2005   (JP) ............................ 2005-143172

(51) Int. Cl.
| | |
|---|---|
| G01S 13/34 | (2006.01) |
| G01S 13/08 | (2006.01) |
| G01S 13/93 | (2006.01) |
| G01S 13/00 | (2006.01) |

(52) U.S. Cl. ............................ 342/128; 342/27; 342/28; 342/70; 342/89; 342/91; 342/118; 342/159; 342/175; 342/192; 342/195; 342/196

(58) Field of Classification Search ................... 342/27, 342/28, 70–72, 89–103, 118, 128–133, 159, 342/165, 173–175, 192–197, 13–20, 205; 367/87, 95, 97, 99, 100–103; 375/130, 140, 375/147–153

See application file for complete search history.

(56) References Cited

U.S. PATENT DOCUMENTS 3,992,709 A * 11/1976 Watanabe et al. ............. 342/18
4,122,452 A * 10/1978 Richmond .................... 342/19

(Continued)

FOREIGN PATENT DOCUMENTS

JP         09-243738         9/1997

(Continued)

OTHER PUBLICATIONS

International Search Report PCT/JP2006/308199 dated Jun. 20, 2006.

(Continued)

*Primary Examiner*—Bernarr E Gregory
(74) *Attorney, Agent, or Firm*—Dickstein, Shapiro, LLP.

(57) ABSTRACT

A radar for detecting a target wherein a standard deviation of the amplitude of a beat signal from a transmission signal and a reception signal is determined for a predetermined period. A threshold is determined by adding a predetermined value to the standard deviation or by multiplying the standard deviation by a predetermined coefficient. The presence or absence of interference on the beat signal is detected according to the presence or the absence of an amplitude greater than the threshold. For example, an amplitude exceeding the standard deviation×2 is considered a spike noise (SPN), i.e., as "presence of interference". The threshold used for detecting peaks appearing on a frequency spectrum is then increased. This allows detection of the presence or the absence of a spike noise superposed on the beat signal to be performed more certainly, thereby enabling processing according to the presence or the absence of interference.

8 Claims, 9 Drawing Sheets

U.S. PATENT DOCUMENTS

| | | | | |
|---|---|---|---|---|
| 4,156,874 | A * | 5/1979 | Kopis | 342/71 |
| 4,356,489 | A * | 10/1982 | Hirota et al. | 342/71 |
| 4,549,286 | A * | 10/1985 | Langeraar et al. | 367/97 |
| 4,688,042 | A * | 8/1987 | Cronson et al. | 342/19 |
| 4,992,793 | A * | 2/1991 | Dibrell et al. | 342/16 |
| 5,274,380 | A * | 12/1993 | Yatsuka et al. | 342/70 |
| 5,379,043 | A * | 1/1995 | Bishop | 342/17 |
| 5,412,390 | A * | 5/1995 | Peavey et al. | 342/196 |
| 5,481,503 | A * | 1/1996 | Kuhn et al. | 367/100 |
| 6,028,549 | A * | 2/2000 | Buckreuss et al. | 342/159 |
| 6,043,770 | A * | 3/2000 | Garcia et al. | 342/13 |
| 6,094,160 | A * | 7/2000 | Lajiness | 342/70 |
| 6,618,003 | B2 * | 9/2003 | Voigtlaender et al. | 342/159 |
| 6,867,730 | B2 * | 3/2005 | Gottwald et al. | 342/159 |
| 6,888,491 | B2 * | 5/2005 | Richter | 342/70 |
| 6,894,641 | B2 * | 5/2005 | Uehara et al. | 342/130 |
| 7,167,505 | B2 * | 1/2007 | Nishio et al. | 375/147 |
| 7,339,518 | B2 * | 3/2008 | Natsume et al. | 342/70 |
| 2002/0130810 | A1 * | 9/2002 | Gottwald et al. | 342/159 |
| 2002/0130811 | A1 * | 9/2002 | Voigtlaender et al. | 342/159 |
| 2003/0108091 | A1 * | 6/2003 | Nishio et al. | 375/148 |
| 2003/0179131 | A1 * | 9/2003 | Brosche | 342/159 |
| 2004/0090361 | A1 * | 5/2004 | Brosche | 342/159 |
| 2004/0095269 | A1 * | 5/2004 | Uehara et al. | 342/159 |

FOREIGN PATENT DOCUMENTS

| | | |
|---|---|---|
| JP | 07-110373 | 4/1999 |
| JP | 2002-168947 | 6/2002 |
| JP | 2004-264258 | 9/2004 |
| JP | 2004-286537 | 10/2004 |
| JP | 2006-064567 | 3/2006 |
| WO | WO 2006/123499 | 11/2006 |

OTHER PUBLICATIONS

Written Opinion PCT/JP2006/308199 dated Jun. 20, 2006.

* cited by examiner

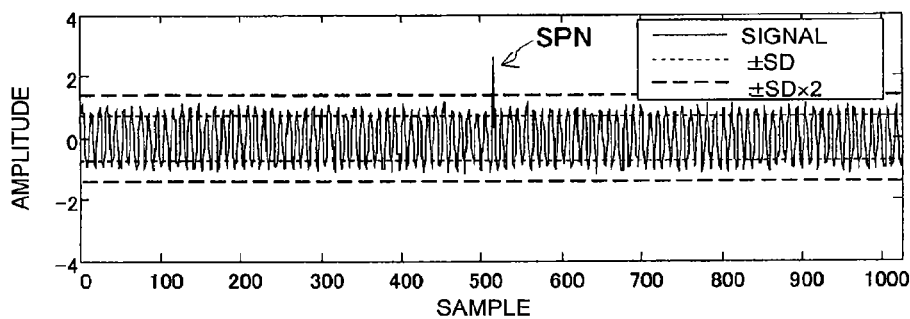
FIG. 6(A)
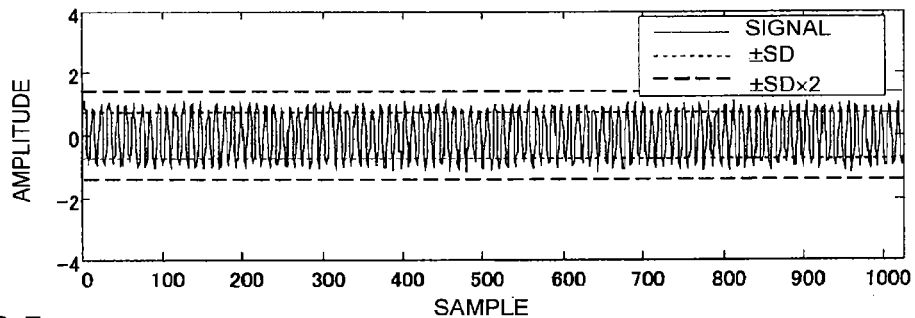
FIG. 6(B)
FIG. 7
FREQUENCY ANALYSIS
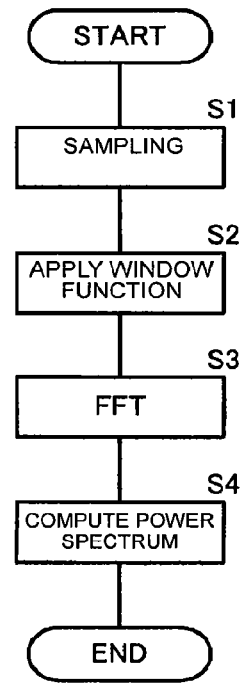

APPROVED: /BG/

FIG. 10
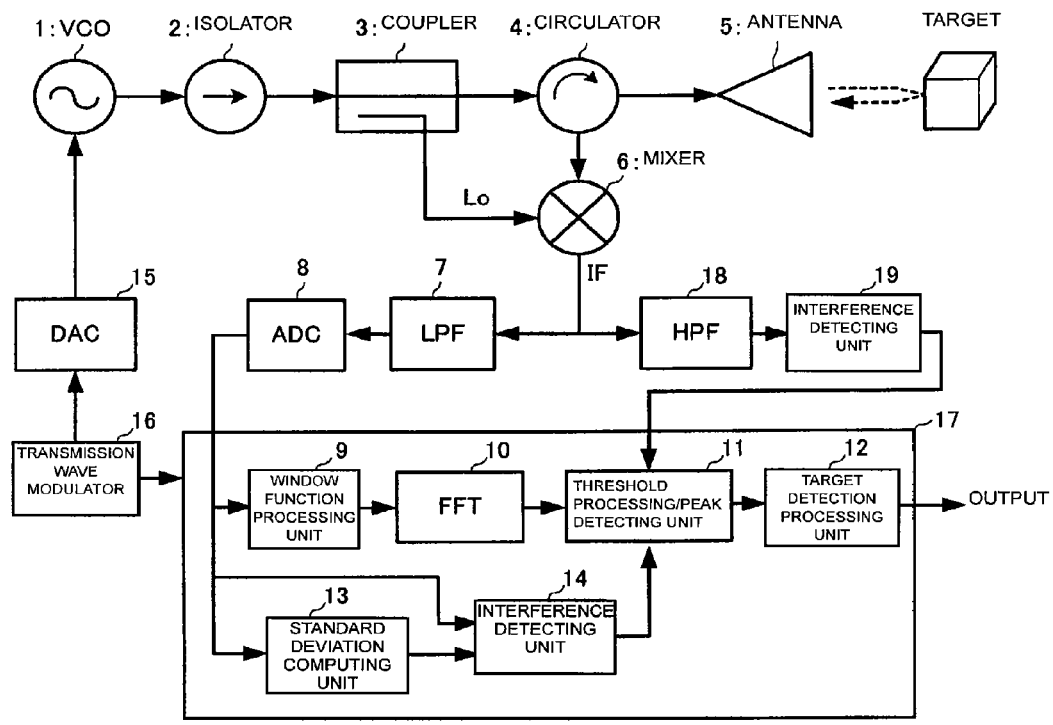
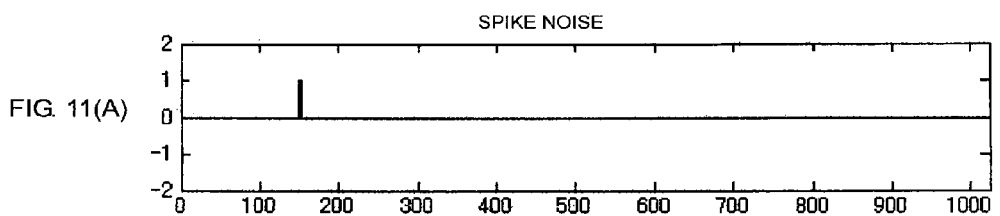
FIG. 11(A) SPIKE NOISE
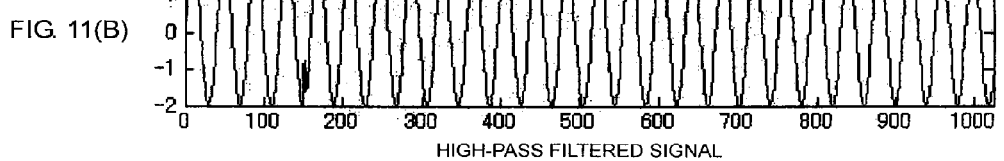
FIG. 11(B) IF SIGNAL
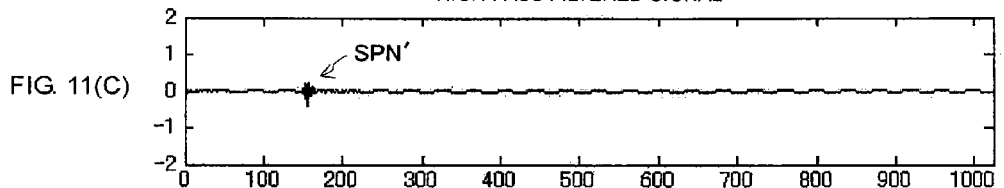
FIG. 11(C) HIGH-PASS FILTERED SIGNAL
SPN'

RADAR

CROSS REFERENCE TO RELATED APPLICATIONS

The present application is a continuation of International Application No. PCT/JP2006/308199, filed Apr. 19, 2006, which claims priority to Japanese Patent Application No. JP2005-143172, filed May 16, 2005, the entire contents of each of these applications being incorporated herein by reference in their entirety.

FIELD OF THE INVENTION

The present invention relates to FM-CW (Frequency Modulated-Continuous Wave) radars that detect a target through transmission and reception of electromagnetic beams.

BACKGROUND OF THE INVENTION

Hitherto, in FM-CW radars, serving as on-vehicle radars, that use a millimeter wave, there has been a problem of interference with radars mounted on other vehicles. More specifically, as shown in FIG. 4(A), when a vehicle MM and another vehicle OM1 on each of which a radar that radiates beams in an azimuth direction is mounted face each other, a spike noise is superposed on (mixed in) a beat signal at the time that the beat is caused between the reception signal and a transmission signal of the vehicle MM after the vehicle MM directly receives a transmission signal from the other vehicle OM1. In addition, as shown in FIG. 4(B), a vehicle MM on which a radar that performs beam scans is mounted and another vehicle OM2 on which a monopulse radar is mounted face each other, a spike noise is superposed on a beat signal of a transmission signal and a reception signal. Furthermore, as shown in FIG. 4(C), when another vehicle OM4 that runs in front of a vehicle MM exists and still another vehicle OM3 that transmits a radio wave to this other vehicle OM4 exists, a signal transmitted from the radar mounted on the other vehicle OM3 and reflected from the other vehicle OM4 is superposed on a reception signal of a radar of an vehicle MM, due to which a spike noise is superposed on a beat signal.

Patent Document 1 discloses a method for performing detection of such a spike noise.

Patent Document 1: Japanese Unexamined Patent Application Publication No. 2002-168947

In a method described in Patent Document 1, when an amplitude level of a reception signal exceeds a predetermined threshold, it is determined that interference exists.

However, there is a problem that the interference cannot be detected except when a spike noise having the amplitude greater than the expected maximum amplitude of a reflected signal (i.e., a reception signal) is mixed in.

In another particular circumstance, Patent Document 1 also describes that, when the frequency of a signal is higher than a predetermined value, the signal is considered as an interference wave. However, high frequency components unnecessary for target detection have only to be excluded from a subject of the target detection, which is not problematic from the beginning.

In addition, in still another particular circumstance, Patent Document 1 describes that, if a correlation between a beat signal determined in the last frame and a beat signal determined in this frame is not obtained in a case where one frame is constituted by an up-modulation interval and a down-modulation interval and the frame is repeated, it is determined that "interference exists". However, when relative speed of a vehicle or another vehicle, namely, a target, is high, the correlation cannot be obtained and it may be mistakenly determined that "interference exists".

SUMMARY OF THE INVENTION

Accordingly, it is an object of the present invention to provide radars that allow processing to be certainly performed according to presence or absence of interference by permitting detection of presence or absence of a spike noise superposed on a beat signal to be performed more certainly.

To solve the above-described problems, radars according to this invention are configured as follows.

(1) A radar, having an electromagnetic wave transmitting and receiving means for transmitting an electromagnetic wave whose frequency gradually changes within a predetermined frequency range as time passes and for receiving the magnetic wave reflected from a target, means for determining a frequency spectrum of a beat signal of the transmission signal and the reception signal, and means for detecting information of the target on the basis of a data item exceeding a noise threshold among data items constituting the frequency spectrum, includes means for determining a standard deviation of amplitude of the beat signal for a predetermined period (interval), for determining a threshold by adding a predetermined value to the standard deviation or by multiplying the standard deviation by a predetermined coefficient, and for detecting presence or absence of interference on the beat signal (presence or absence of superposition of a spike noise on the beat signal) according to presence or absence of amplitude greater than the threshold, and signal processing means for performing processing on the beat signal according to presence or absence of the interference.

(2) A radar includes a high pass filter for allowing high frequency components of the beat signal to pass through, means for detecting presence or absence of interference on the beat signal (presence or absence of superposition of a spike noise on the beat signal) according to whether or not amplitude of the high pass filtered signal exceeds a predetermined threshold, and signal processing means for performing processing on the beat signal according to presence or absence of the interference.

(3) A radar includes first interference detecting means for determining a standard deviation of amplitude of the beat signal for a predetermined period (interval), for determining a threshold by adding a predetermined value to the standard deviation or by multiplying the standard deviation by a predetermined coefficient, and for detecting presence or absence of interference on the beat signal (presence or absence of superposition of a spike noise on the beat signal) according to presence or absence of amplitude greater than the threshold, a high pass filter for allowing high frequency components of the beat signal to pass through, second interference detecting means for detecting presence or absence of interference on the beat signal according to whether or not amplitude of the high pass filtered signal exceeds a predetermined threshold, and signal processing means for performing processing on the beat signal according to the detection results of the first and second interference detecting means.

(4) A radar includes a high pass filter for allowing high frequency components of the beat signal to pass through, means for determining a standard deviation of amplitude of the high pass filtered signal for a predetermined period, for determining a threshold by adding a predetermined value to the standard deviation or by multiplying the standard deviation by a predetermined coefficient, and for detecting presence or absence of interference on the beat signal according to presence or absence of amplitude greater than the threshold, and signal processing means for performing processing on the beat signal according to presence or absence of the interference.

(5) A radar includes means for setting reference amplitude of the beat signal, interference detecting means for detecting presence or absence of interference on the beat signal (presence or absence of superposition of a spike noise on the beat signal) according to whether or not the amplitude of the beat signal exceeds the reference amplitude by a predetermined ratio or a predetermined value, and signal processing means for performing processing on the beat signal according to the detection result of the interference detecting means.

(6) The electromagnetic wave transmitting and receiving means performs scans of electromagnetic beams in the azimuth direction. The reference amplitude is determined on the basis of amplitude of a beat signal for a beam in the same direction used in a previous scan that is different from this scan.

(7) The electromagnetic wave transmitting and receiving means directs the electromagnetic beams to a plurality of different directions and performs transmission and reception for each beam. The reference amplitude is determined on the basis of amplitude of a beat signal determined for a beam neighboring (adjacent to) the focused beam.

(8) The reference amplitude is determined on the basis of amplitude of a beat signal in a neighboring (adjacent) modulation interval.

ADVANTAGES (1) According to the presence or absence of amplitude that is greater than a threshold determined by adding a predetermined value to a standard deviation of amplitude of a beat signal during a predetermined period or by multiplying the standard deviation by a predetermined coefficient, presence or absence of interference on the beat signal (presence or absence of superposition of a spike noise on the beat signal) is detected. Accordingly, since a spike noise caused by interference exceeds the threshold even if amplitude of the spike noise to be superposed on the beat signal is relatively small, presence or absence of interference can be certainly detected.

(2) By detecting presence or absence of interference according to whether or not amplitude of the signal through a high pass filter, which allows high frequency components of the beat signal to pass through, exceeds a predetermined threshold, a spike noise having amplitude smaller than that of the beat signal can be certainly detected.

(3) Detection of presence or absence of superposition of a spike noise on a beat signal is performed using a threshold determined on the basis of the standard deviation. In addition, presence or absence of interference is detected according to whether or not a high pass filtered signal exceeds a predetermined threshold. By performing processing on the beat signal according to the presence or absence of interference based on these two detections, certainty of detection of the presence or absence of interference can be increased.

(4) According to the presence or absence of amplitude that is greater than a threshold determined by adding a predetermined value to a standard deviation of amplitude of a beat signal, gone through a high pass filter that allows high frequency components of the beat signal to pass through, during a predetermined period or by multiplying the standard deviation by a predetermined coefficient, presence or absence of interference on the beat signal (presence or absence of superposition of a spike noise on the beat signal) is detected. Accordingly, if amplitude of the spike noise to be superposed on the beat signal is smaller than the amplitude of the beat signal, the spike noise can be certainly detected.

(5) Amplitude of a beat signal serving as a reference (reference amplitude) is determined. A state in which amplitude exceeds the reference amplitude by a predetermined ratio or a predetermined value is detected as "presence of interference". This makes setting of a highly accurate threshold easier. As a result, presence or absence of a spike noise due to the interference can be detected more certainly.

(6) Scans of electromagnetic beams in the azimuth direction are repeated. The reference amplitude is determined on the basis of amplitude of a beat signal for a beam in the same direction used in a previous scan at different scan timing. By this, an appropriate threshold value based on background noise components can be set easily.

(7) By determining the reference amplitude on the basis of amplitude of a beat signal for a beam neighboring (for example, adjacent to) the focused beam in the azimuth direction, an appropriate threshold value based on background noise components can be set easily.

(8) By determining the reference amplitude on the basis of amplitude of a beat signal in a neighboring (for example, adjacent) modulation interval of the repeated modulation intervals, an appropriate threshold value based on background noise components can be set easily.

BRIEF DESCRIPTION OF THE DRAWINGS

FIGS. 6(A) and 6(B) are diagrams showing relations between waveforms of a beat signal on which a spike noise is superposed and a beat signal on which a spike noise is not superposed and a standard deviation.

FIG. 7 is a flowchart showing a procedure of frequency analysis in the radar.

FIG. 10 is a block diagram showing a configuration of the entirety of a radar according to a second embodiment.

FIGS. 11(A), 11(B) and 11(C) are diagrams showing waveforms of a spike noise, of a beat signal on which the spike noise is superposed, and of a high-pass filtered signal.

REFERENCE NUMERALS

17 DSP
ADC AC converter
DAC DA converter
VCO voltage-controlled oscillator

DETAILED DESCRIPTION OF THE INVENTION

A configuration of a radar according to a first embodiment will be described with reference to FIG. 1 to FIG. 9.

Figure 1:
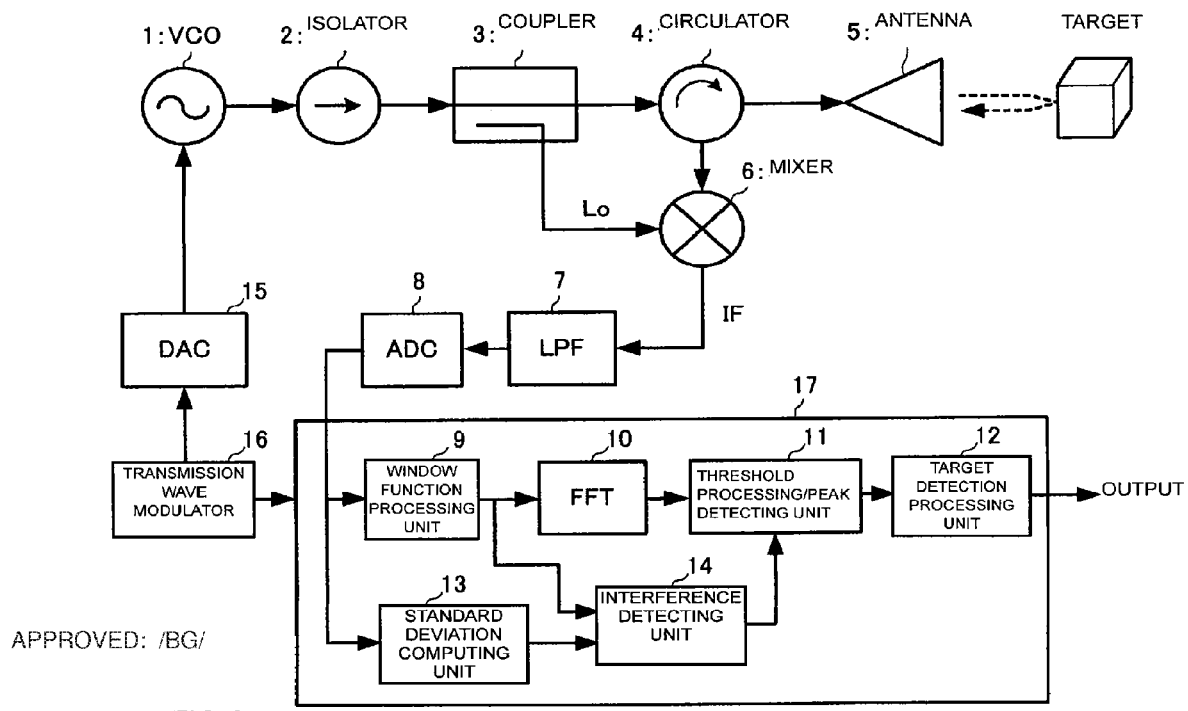
FIG. 1 is a block diagram showing a configuration of the entirety of a radar according to a first embodiment.

FIG. 1 is a block diagram showing a configuration of the entirety of a radar. A transmission wave modulator 16 sequentially outputs digital data of a modulation signal to a DA converter 15. A VCO 1 alters an oscillation frequency according to a control voltage output from the DA converter 15, thereby FM-modulating the oscillation frequency of the VCO 1 to generate a continuous triangular wave. An isolator 2 transmits an oscillation signal from the VCO 1 to a coupler 3 to prevent a reflected signal from coming into the VCO 1. The coupler 3 transmits the signal having been through the isolator 2 to a circulator 4. The coupler 3 also supplies part of the transmission signal to a mixer 6 as a local signal Lo at a predetermined distribution ratio. The circulator 4 transmits the transmission signal to an antenna 5. The circulator 4 also supplies a reception signal from the antenna 5 to the mixer 6. The antenna 5 transmits the FM-modulated continuous wave transmission signal supplied from the VCO 1 and receives the signal reflected from the same direction. In addition, the antenna 5 periodically alters a direction of beams over a predetermined detection angle range to perform a beam scan.

The mixer 6 mixes the local signal Lo from the coupler 3 and the reception signal from the circulator 4, and outputs a beat signal (i.e., an intermediate frequency signal IF). A low pass filter 7 eliminates unnecessary high frequency components of the IF signal. An AD converter 8 converts the signal into a sampling data sequence, and supplies the sampling data sequence to a DSP (digital signal processor) 17.

The DSP 17 temporarily buffers the digital data sequence, which is converted by the AD converter 8, for at least one scan (for a plurality of beam scans within a predetermined detection angle range), and calculates the azimuth, the distance, and the speed of a target through processing described below.

In the DSP 17, a window function processing unit 9 performs weighting (clipping) on the sampling data sequence with a predetermined window function. An FFT computing unit 10 analyzes frequency components by performing FFT calculation on the data items in the sampling interval windowed by the window function.

A standard deviation computing unit 13 determines a standard deviation of amplitude on the basis of amplitude data items of the input sampling data sequence during a predetermined period (interval).

An interference detecting unit 14 determines whether or not each sampling data item (amplitude) in the sampling interval, which is clipped from the input sampling data sequence in order to determine a frequency spectrum, exceeds a threshold. The threshold is determined by adding a predetermined value to the standard deviation determined by the standard deviation computing unit 13 or by multiplying the standard deviation by a predetermined coefficient. If a data item exceeding the threshold exists, the interference detecting unit 14 determines that "interference exists". This interference detecting unit 14 supplies an appropriate noise threshold to a threshold processing/peak detecting unit 11 according to presence or absence of interference.

The threshold processing/peak detecting unit 11 extracts a frequency and a peak value of each target peak that exceeds the noise threshold in the frequency spectrum on the basis of the noise threshold set by the interference detecting unit 14.

A target detection processing unit 12 calculates the distance to the target and the speed of the target on the basis of the peak frequency of the detected target peak.

Figure 2:
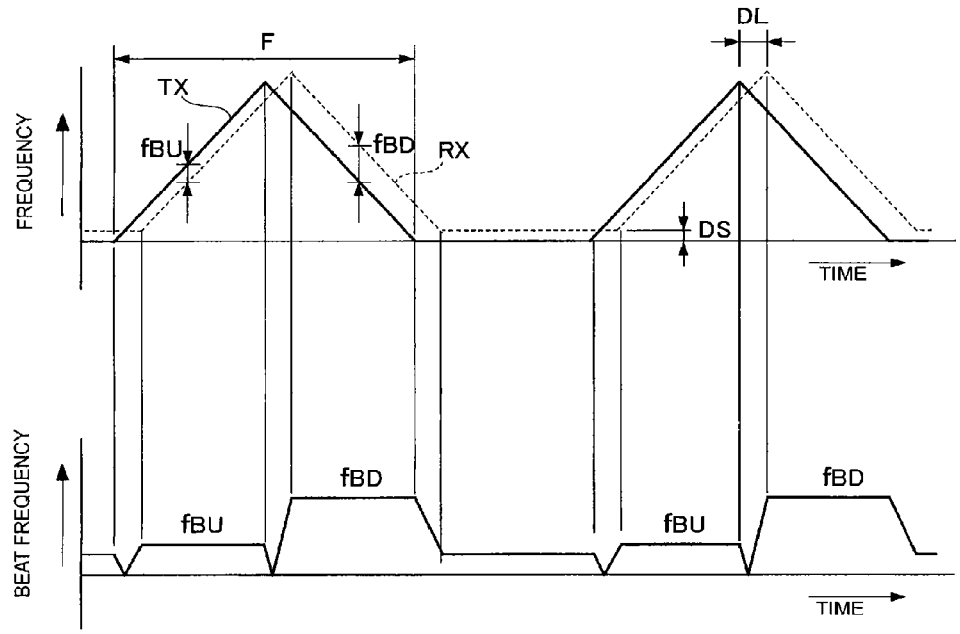
FIG. 2 is a diagram showing an example of changes in frequencies of a reception signal and a transmission signal that change according to a distance to a target from the radar and a relative speed of the target.

FIG. 2 shows examples of a difference of frequency change between a transmission signal and a reception signal resulting from a distance to a target and a relative speed. In a transmission signal TX, a frame F, constituted by an up-modulation interval in which the frequency increases and a down-modulation interval in which the frequency decreases, is repeated. The frequency difference between the transmission signal and the reception signal RX during the period in which the frequency of the transmission signal TX increases is an upbeat frequency fBU. The frequency difference between the transmission signal and the reception signal during the period in which the frequency of the transmission signal decreases is a downbeat frequency fBD. The a lag on the time axis (time difference) DL between triangular waves of the transmission signal TX and the reception signal RX corresponds to the time taken for the radio wave to go and return between the antenna and the target. In addition, a difference between the transmission signal and the reception signal on the frequency axis is a Doppler shift amount DS, which is caused by the relative speed of the target with respect to the antenna. The upbeat frequency fBU and the downbeat frequency fBD vary due to the time difference and the Doppler shift amount. Conversely, the distance from the radar to the target and the relative speed of the target with respect to the radar are calculated by detecting this upbeat frequency fBU and the downbeat frequency fBD.

Figure 3:
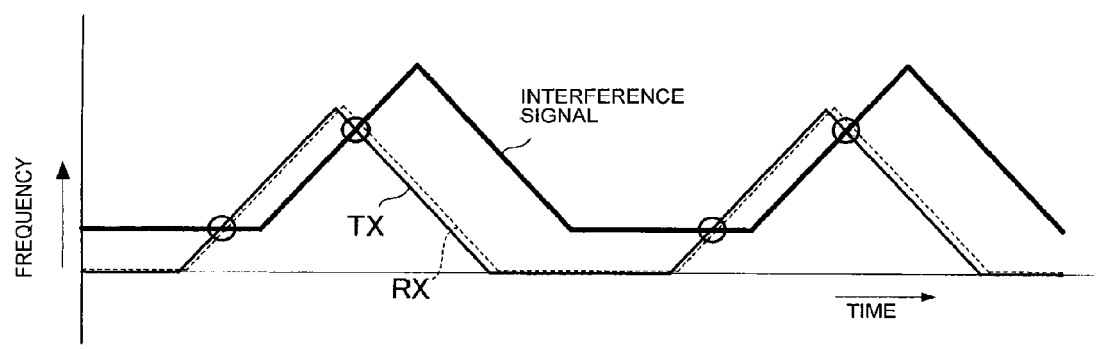
FIG. 3 is a diagram showing an interference signal and an example of timing that spike noises are caused.
Figure 4A:
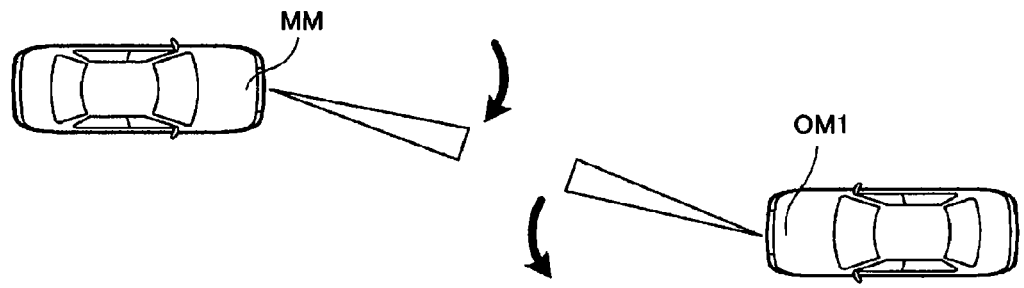
FIGS. 4(A), 4(B) and 4(C) are diagrams showing examples of various cases causing interference.
Figure 4B:
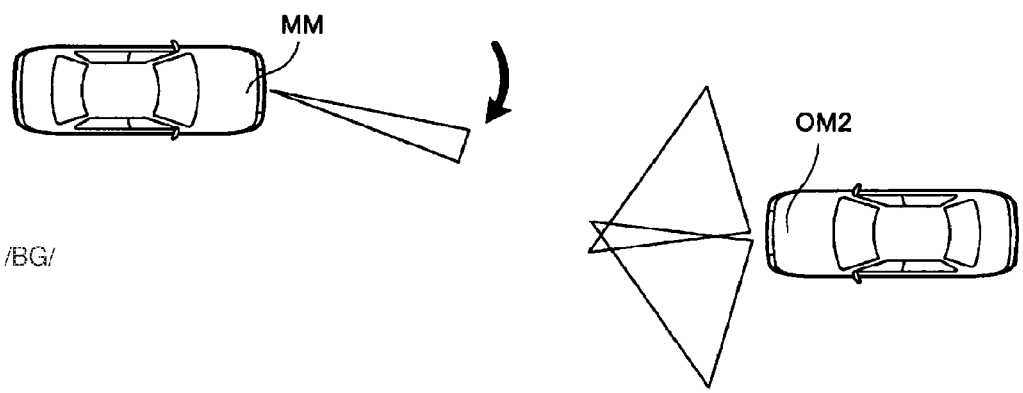
Figure 4C:
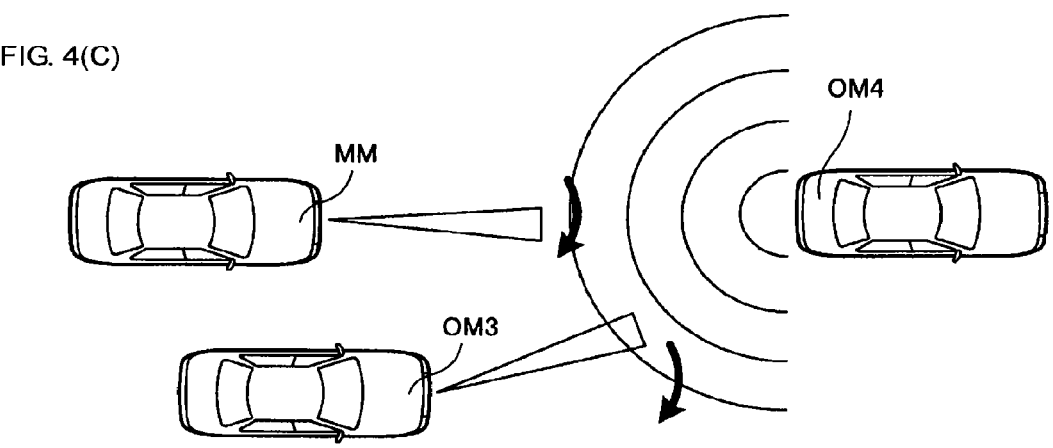

FIG. 3 shows the transmission and reception signals, and generation of an interference signal and a spike noise. As already been described using FIGS. 4(A) to 4(C), when an interference signal from another vehicle exists, a spike noise is superposed on a beat signal at timings, indicated by circles in the drawing, that the frequency of the transmission signal TX of the vehicle becomes substantially equal to the frequency of the interference signal. This is because the interference signal from the other vehicle generally significantly deviates from the modulation frequency and the modulation phase of the transmission signal of the vehicle.

Figure 5A:
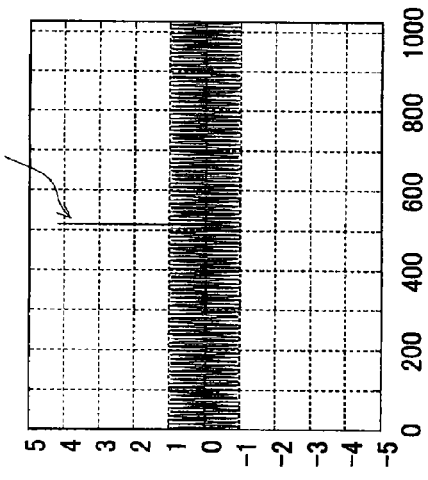
FIGS. 5(A), 5(B), 5(C) and 5(D) are diagrams showing examples of spike noises superposed on beat signals and examples of changes in frequency spectra due to the spike noises.
Figure 5B:
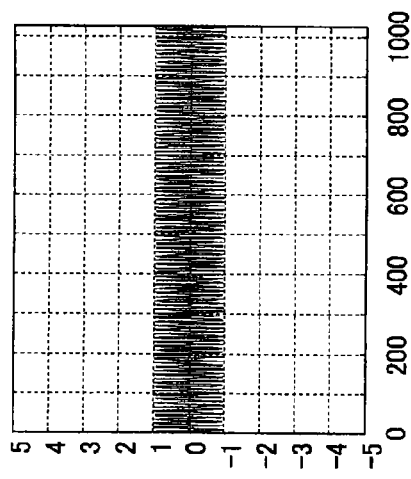

FIGS. 5(A) to 5(D) show examples of spike noises and of changes in frequency spectra according to presence or absence thereof. Both of FIGS. 5(A) and 5(B) show a time-domain waveform of a beat signal. The horizontal axis represents 1st to 1024th sampling data items clipped in the time domain, whereas the vertical axis represents normalized amplitude. As shown in FIG. 3, when an interference signal does not exist or when frequencies of a transmission signal and an interference signal significantly deviate from one another, a beat signal shown in FIG. 5(A) is obtained. If the frequency difference between the transmission signal and the interference signal is in a frequency band of the intermediate frequency signal, a spike noise SPN is superposed on a beat signal as shown in FIG. 5(B).

Figure 5C:
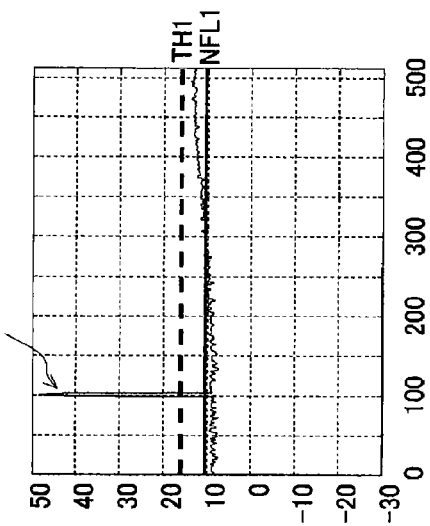
Figure 5D:
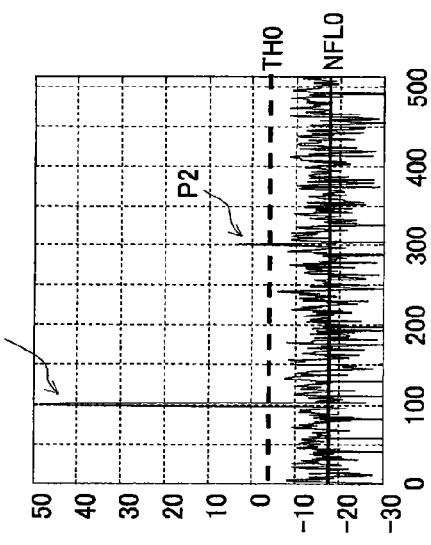

FIG. 5(C) shows a frequency spectrum of the beat signal shown in FIG. 5(A), whereas FIG. 5(D) shows a frequency spectrum of the beat signal shown in FIG. 5(B). In the both drawings, the horizontal axis represents a frequency (a frequency bin of FFT), whereas the vertical axis represents normalized power. In a steady state in which the spike noise SPN is not superposed on the beat signal, a noise floor level NFL0 is relatively low as shown in FIG. 5(C). By setting a threshold TH0 that is higher than this noise floor level NFL0 by a predetermined value, peaks P1 and P2 exceeding this threshold TH0 are extracted as target peaks.

On the other hand, if the spike noise SPN is superposed on the beat signal as shown in FIG. 5(B), a noise floor level NFL1 of the frequency spectrum becomes relatively high as shown in FIG. 5(D). Accordingly, by setting a threshold TH1 that is higher than this noise floor level NFL1 by a predetermined value, a peak P1 exceeding this threshold TH1 is extracted as a target peak.

FIGS. 6(A) and 6(B) are diagrams showing relations between amplitude of a beat signal and amplitude of a spike noise superposed thereon. Here, the horizontal axis represents a period (time) in units of millisecond, whereas the vertical axis represents normalized amplitude. FIG. 6(A) shows a waveform in an interval in which a spike noise SPN is superposed on a beat signal, whereas FIG. 6(B) shows a waveform in an interval in which a spike noise is not superposed. In either case, a fine broken line represents a level of a standard deviation of amplitude, while a coarse broken line represents the standard deviation multiplied by 2.

As shown, the amplitude of the beat signal generally does not exceed the standard deviation×2, but the spike noise SPN sometimes exceeds the standard deviation×2. Accordingly, as shown in this example, the value obtained by multiplying the standard deviation of amplitude of the beat signal, which is determined from the input beat signal, by 2 is used as the threshold. If the data item exceeding the threshold exists, the data is considered as the spike noise, and thus it is possible to determine that "interference exists".

Regarding the spike noise SPN, since the time for the frequency difference between the transmission signal and the interference signal to become small is short as shown in FIG. 3, the standard deviation of the amplitude of the beat signal determined when such a spike noise SPN is superposed hardly differs from the standard deviation determined when the spike noise SPN is not superposed. For this reason, it is possible to appropriately set a threshold on the basis of the standard deviation determined whether or not the spike noise SPN is superposed on the beat signal.

Figure 8:
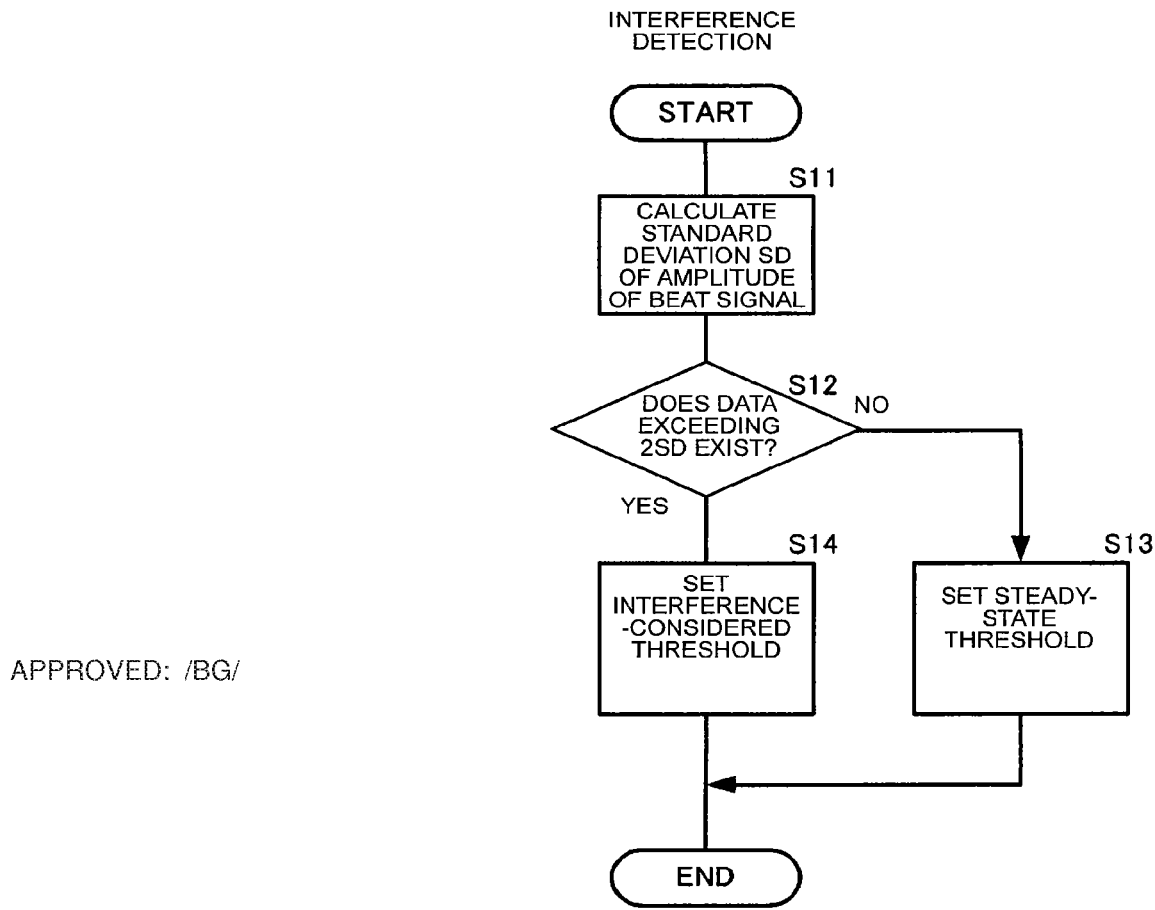
FIG. 8 is a flowchart showing a procedure regarding interference detection in the radar.
Figure 9:
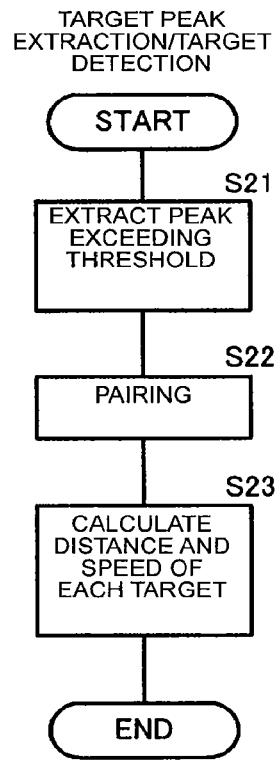
FIG. 9 is a flowchart showing a procedure regarding target peak extraction and target detection in the radar.

FIG. 7 to FIG. 9 are diagrams showing contents of processing of the DSP 17 shown in FIG. 1 as flowcharts.

FIG. 7 is a content of processing regarding frequency analysis. Firstly, the DSP 17 samples data items in a processing target range from the digital data sequence converted by the AD converter 8, and applies a window function on the sampled data items (S1→S2). Subsequently, the DSP 17 performs FFT calculation on the predetermined number of data items (S3). Thereafter, the DSP 17 determines a root of a sum of a square of the real part of each determined frequency bin and a square of the imaginary part of the frequency bin to further determine a power spectrum (S4).

FIG. 8 is a flowchart showing a content of processing of interference detection. Firstly, the DSP 17 calculates a standard deviation SD of amplitude of a beat signal (S11). Thereafter, the DSP 17 determines whether or not a data item of the amplitude of the beat signal exceeding a doubled value of the standard deviation SD exists in the FFT-target data sequence (S12). If a data item exceeding 2SD does not exit, the DSP 17 sets a steady-state noise threshold in the threshold processing/peak detecting unit 11 shown in FIG. 1 (S13). If a data item exceeding 2SD exists, the DSP 17 considers that "interference exists" and sets an interference-considered noise threshold (S14). For example, as shown in FIG. 5, the DSP 17 sets a threshold higher than the noise floor level NFL1 by a predetermined value in order not to mistakenly detect those noises as peaks as the noise floor level NFL0 increases to the noise floor level NFL1.

In FIG. 1, the standard deviation computing unit 13 determines a standard deviation of a sampling data sequence on which the window function processing is not performed by the window function processing unit 9. However, the standard deviation computing unit 13 may determine the standard deviation of window-function-processed sampling data sequence, which is the FFT target.

FIG. 9 is a flowchart showing a procedure regarding target peak extraction and target detection. The DSP 17 extracts peaks exceeding the threshold, which is set as described above, from the frequency spectrum (S21). Subsequently, the DSP 17 performs pairing on the basis of the frequency and the peak value of the target peak extracted regarding the up-modulation interval and the down-modulation interval (S22). Thereafter, the DSP 17 calculates the distance and the speed of each target, and outputs these results (S23).

A radar according to a second embodiment will be described on the basis of FIG. 10 and FIG. 11 next.

FIG. 10 is a block diagram showing a configuration of a radar according to this second embodiment. A high pass filter 18 allows high frequency component of a beat signal (an intermediate frequency signal IF) to pass therethrough. An interference detecting unit 19 detects presence or absence of interference on the basis of the output signal of the high pass filter 18. According to the presence or absence of interference, the interference detecting unit 19 decides a noise threshold set in a threshold processing/peak detecting unit 11. In addition, an interference detecting unit 14 detects presence or absence of interference on the basis of a signal before application of a window function. Other configurations are similar to those shown in FIG. 1.

FIGS. 11(A) to 11(C) are diagrams showing examples of waveforms of a spike noise to be superposed on a beat signal and of a high-pass filtered signal. In FIGS. 11(A) to 11(C), the horizontal axis represents 1st to 1024th sampling data items clipped in a time domain, whereas the vertical axis represents normalized amplitude. FIG. 11(A) shows only a waveform of a spike noise, whereas FIG. 11(B) shows a waveform of a beat signal on which the spike noise is superposed. FIG. 11(C) shows a waveform of the high-pass filtered beat signal. For example, a cutoff frequency of the high pass filter 18 is set to approximately a half of a Nyquist frequency (fs/4), which is determined as a half of a sampling frequency fs. Since the power of the spike noise distribute equally over all bands in the frequency domain, the half of the power is lost though the high pass filter and the amplitude becomes approximately 1/$\sqrt{2}$ of the original. On the other hand, almost all of signals reflected from near targets having low frequencies are lost, while only reflected signals reflected from relatively far targets having frequencies equal to or greater than fs/4 are detected. Due to the characteristic of a radar that a reception power decrease at 1/(distance to the fourth), the amplitude of these signal becomes small. Thus, only spike noise components SPN' due to interference are extracted as signals having extremely large amplitude when it compared with that of the signals from the target.

The interference detecting unit 19 shown in FIG. 10 sets a predetermined threshold for a signal having gone through the high pass filter 18. The interference detecting unit 19 detects presence or absence of interference according to whether or not the signal exceeds the threshold.

If interference exists, two interference detecting units 14 and 19 generally detect the interference. However, depending on the course or the degree of the interference, only one of the two interference detecting units 14 and 19 may detect "presence of interference". In such a case, according to the interference detecting unit 14 or 19 that has detected the interference, an appropriate noise threshold is supplied to the threshold processing/peak detecting unit 11. This appropriate threshold may be set independently by the two interference detecting units 14 and 19.

In addition, an interference-considered threshold and an interference-unconsidered threshold may be determined. According to whether both of the two interference detecting units 14 and 19 detect "presence of interference" or "absence of interference", one of the thresholds may be selectively applied.

Meanwhile, this second embodiment shows an example of including the two interference detecting units 14 and 19. However, only the high pass filter 18 and the interference detecting unit 19 may be provided for detection of presence or absence of the interference, the presence or absence of the interference may be detected based on the high-pass filtered beat signal, and the threshold may be set only according to the detection result.

A radar according to a third embodiment will be described on the basis of FIG. 12 next.

Figure 12:
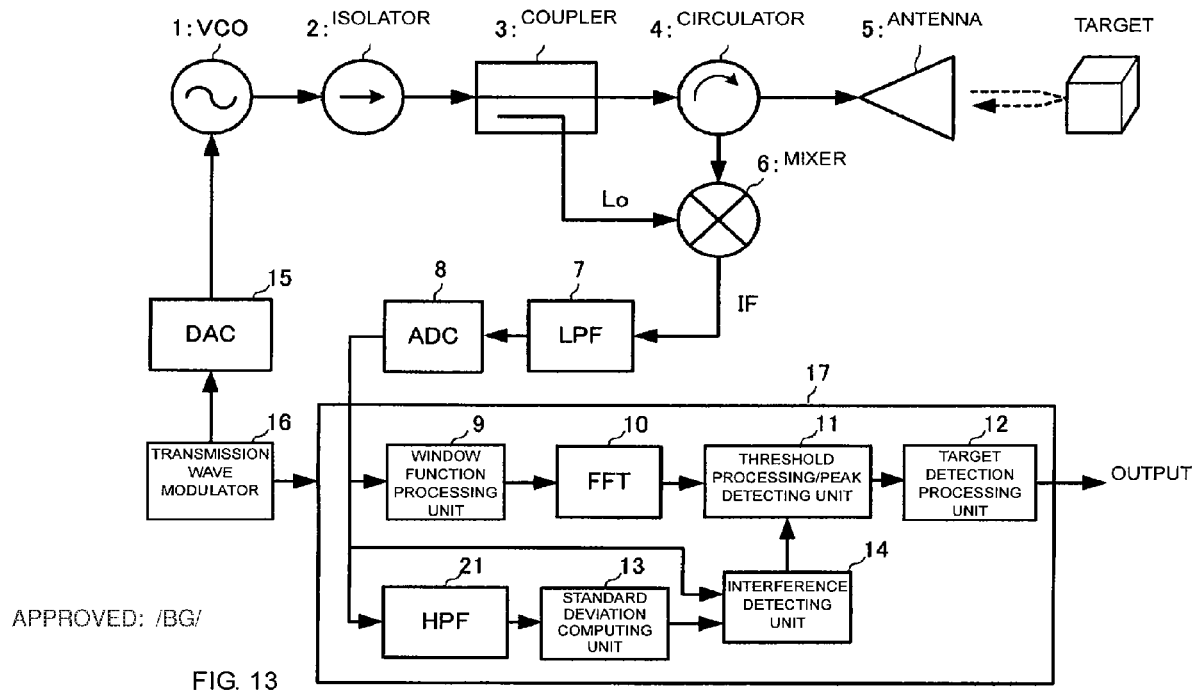
FIG. 12 is a block diagram showing a configuration of the entirety of a radar according to a third embodiment.

FIG. 12 is a block diagram showing a configuration of a radar according to this third embodiment. A high pass filter 21 is a filter for digital computation, and allows high frequency components of a beat signal (an intermediate frequency signal IF) to pass therethrough. A standard deviation computing unit 13 determines a standard deviation of amplitude on the basis of amplitude data items of the input signal having gone through the high pass filter 21 in a predetermined period (a predetermined interval). Other configurations are similar to those shown in FIG. 1.

A threshold is determined by adding a predetermined value to or by multiplying a predetermined coefficient by the standard deviation, for the signal having gone through the high pass filter 21, determined by the standard deviation computing unit 13. An interference detecting unit 14 determines presence or absence of data item exceeding the threshold. The interference detecting unit 14 supplies an appropriate noise threshold to a peak detecting unit 11 according to the result.

A radar according to a fourth embodiment will be described next with reference to FIG. 13 and FIGS. 14(A) and 14(B).

Figure 13:
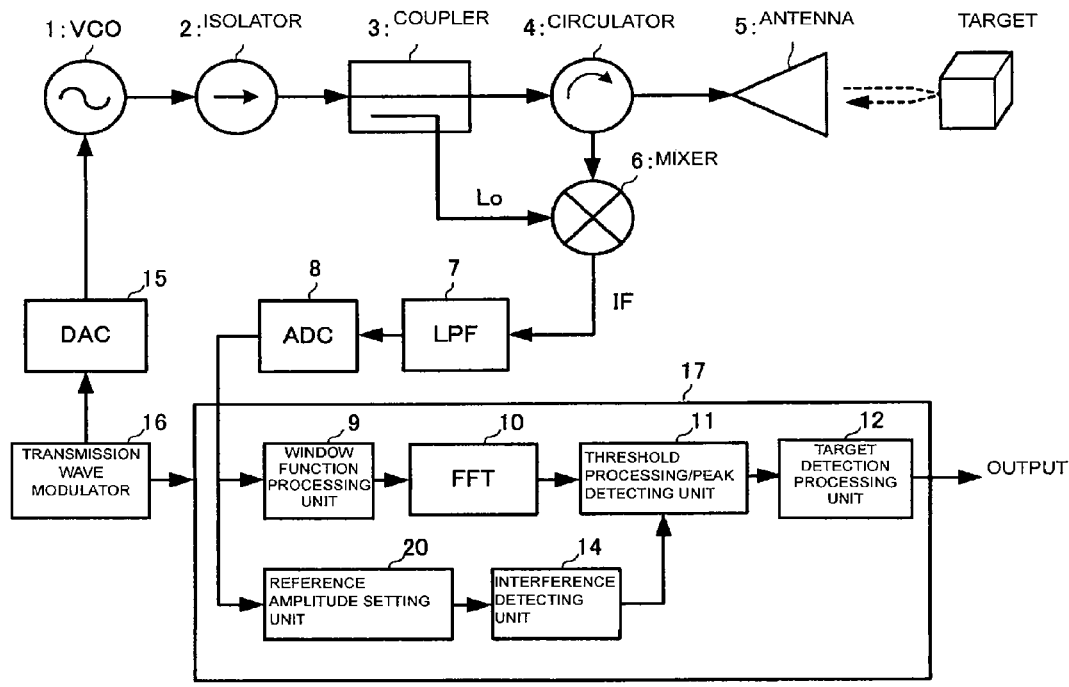
FIG. 13 is a block diagram showing a configuration of the entirety of a radar according to a fourth embodiment.
Figure 14B:
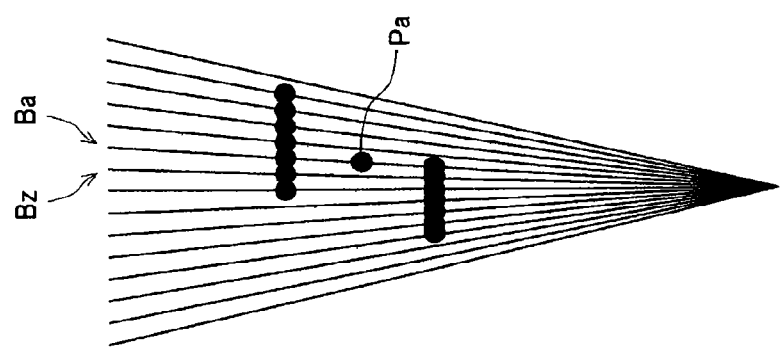
FIGS. 14(A) and 14(B) are diagrams showing each beam and peak positions that appear on frequency spectra determined for each beam as positions in a range direction of the beam using black dots when electromagnetic beams are radiated in an azimuth direction.

In FIG. 13, a reference amplitude setting unit 20 sets reference amplitude used when an interference detecting unit 14 detects presence or absence of interference.

Figure 14A:
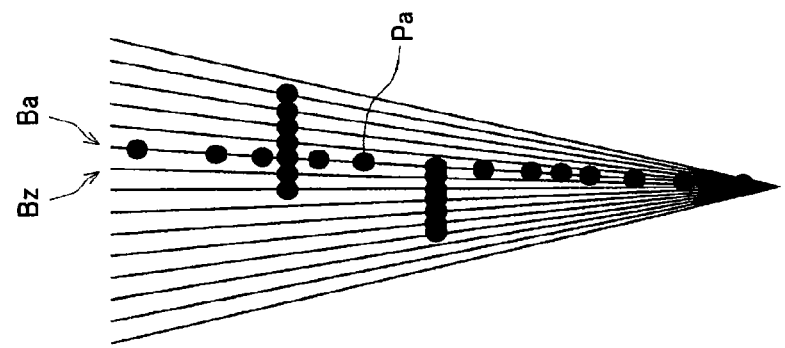

FIGS. 14(A) and (B) are diagrams showing each of electromagnetic beams irradiated in the azimuth direction and showing peak positions that appear (are extracted) on a frequency spectrum determined for each beam as positions on a range direction of the beam using black dots. The reference amplitude setting unit 20 shown in FIG. 13 sets amplitude of a beat signal for a last beam scan in the same direction, among repetition of beam scans in the azimuth direction, as reference amplitude. For example, when a beam Ba is focused, the amplitude of the beat signal for the beam Ba of the last scan is set as the reference amplitude. An interference detecting unit 14 compares the set reference amplitude with the amplitude of a beat signal for a beam Ba of this scan when detecting presence or absence of interference for this beam Ba. The interference detecting unit 14 detects presence or absence of interference according to whether or not a data item exceeding a threshold, determined by adding a predetermined value to or by multiplying a predetermined coefficient by the reference amplitude, exists.

However, since the amplitude of a reception signal varies depending on a distance to a target and a direction of a target even if the reception signal is a reflected signal of the same target, amplitude of a beat signal also varies temporally. For this reason, smoothing processing, such as determination of an average value of a predetermined number of data items, is performed, and the result is used as the reference amplitude.

For example, when "existence of interference" is detected for the beam Ba, a relatively high threshold used by a threshold processing/peak detecting unit 11 is set. Thus, as shown in FIG. 14(B), the noise resulting from interference is not mistakenly extracted as a target peak, but an original target peak Pa can be accurately extracted.

In addition, the reference amplitude setting unit 20 shown in FIG. 13 sets the reference amplitude on the basis of amplitude of a beam signal for an adjacent beam of this scan other than the method for determining the reference amplitude on the basis of the amplitude of the beat signal for the same beam of the last scan. For example, when a beam shown in FIGS. 14(A) and 14(B) is radiated from the left to the right in the drawing, amplitude of a beat signal for a beam Bz immediately prior to the beam Ba is set as the reference amplitude.

In this case, the interference detecting unit 14 determines a threshold by adding a predetermined value to or multiplying a predetermined coefficient by the reference amplitude, and detects presence or absence of interference according to whether or not amplitude of a beat signal for the focused beam Ba exceeds the threshold. If the adjacent beam Bz is not interfered, the beam Ba having interference can be detected as "interference exists". Additionally, if the beam Bz is interfered, amplitude of a beam signal for a previous neighboring beam (past in a time-domain) that is not interfered is set as the reference amplitude.

Additionally, the reference amplitude setting unit 20 shown in FIG. 13 sets the reference amplitude on the basis of amplitude of the beat signal in a modulation interval neighboring the modulation interval of the transmission signal. For example, amplitude of the beat signal in a temporally adjacent previous modulation interval is set as the reference amplitude.

In this case, the interference detecting unit 14 determines a threshold by adding a predetermined value to or multiplying a predetermined coefficient by the reference amplitude, and detects presence or absence of interference according to whether or not amplitude of a beat signal of this frame exceeds the threshold.

The invention claimed is:

1. A radar comprising:
   a transmitter that transmits a transmission signal whose frequency gradually changes over time within a predetermined frequency range;
   a receiver that receives a reception signal reflected from a target;
   a frequency spectrum unit that determines a frequency spectrum of a beat signal of the transmission signal and the reception signal;
   a standard deviation computing unit that determines a standard deviation of an amplitude of the beat signal for a predetermined period;
   a threshold processing unit that determines a threshold by adding a predetermined value to the standard deviation or by multiplying the standard deviation by a predetermined coefficient;
   an interference detecting unit that detects a presence or an absence of interference on the beat signal according to a presence or an absence of an amplitude greater than the threshold;
   a signal processing unit that performs processing on the beat signal according to the presence or the absence of the interference; and
   a detecting unit that detects information of the target based on the amplitude greater than the threshold.

2. A radar comprising:
a transmitter that transmits a transmission signal whose frequency gradually changes over time within a predetermined frequency range;
a receiver that receives a reception signal reflected from a target;
a frequency spectrum unit that determines a frequency spectrum of a beat signal of the transmission signal and the reception signal;
a high pass filter that allows high frequency components of the beat signal to pass through;
an interference detecting unit that detects a presence or an absence of interference on the beat signal according to whether or not an amplitude of the high pass filtered signal exceeds a predetermined threshold;
a signal processing unit that performs processing on the beat signal according to the presence or the absence of the interference; and
a detecting unit that detects information of the target based on the amplitude greater than the threshold.

3. A radar comprising:
a transmitter that transmits a transmission signal whose frequency gradually changes over time within a predetermined frequency range;
a receiver that receives a reception signal reflected from a target;
a frequency spectrum unit that determines a frequency spectrum of a beat signal of the transmission signal and the reception signal;
a first interference detecting unit that determines a standard deviation of an amplitude of the beat signal for a predetermined period;
a threshold processing unit that determines a threshold by adding a predetermined value to the standard deviation or by multiplying the standard deviation by a predetermined coefficient, and that detects a presence or an absence of interference on the beat signal according to a presence or an absence of an amplitude greater than the threshold;
a high pass filter that allows high frequency components of the beat signal to pass through;
a second interference detecting unit that detects a presence or an absence of interference on the beat signal according to whether or not an amplitude of the high pass filtered signal exceeds a predetermined threshold;
a signal processing unit that performs processing on the beat signal according to the detection results of the first and second interference detecting units; and
a detecting unit that detects information of the target based on the amplitude greater than the threshold and/or the predetermined threshold.

4. A radar comprising:
a transmitter that transmits a transmission signal whose frequency gradually changes over time within a predetermined frequency range;
a receiver that receives a reception signal reflected from a target;
a frequency spectrum unit that determines a frequency spectrum of a beat signal of the transmission signal and the reception signal;
a high pass filter that allows high frequency components of the beat signal to pass through;
a standard deviation computing unit that determines a standard deviation of an amplitude of the high pass filtered signal for a predetermined period;
a threshold processing unit that determines a threshold by adding a predetermined value to the standard deviation or by multiplying the standard deviation by a predetermined coefficient;
an interference detecting unit that detects a presence or an absence of interference on the beat signal according to a presence or an absence of an amplitude greater than the threshold;
signal processing unit that performs processing on the beat signal according to the presence or the absence of the interference; and
a detecting unit that detects information of the target based on the amplitude greater than the threshold.

5. A radar comprising:
a transmitter that transmits a transmission signal whose frequency gradually changes over time within a predetermined frequency range;
a receiver that receives a reception signal reflected from a target;
a frequency spectrum unit that determines a frequency spectrum of a beat signal of the transmission signal and the reception signal;
a reference amplitude setting unit that sets a reference amplitude of the beat signal;
an interference detecting unit that detects a presence or an absence of interference on the beat signal according to whether or not an amplitude of the beat signal exceeds the reference amplitude by a predetermined ratio or a predetermined value;
a signal processing unit that performs processing on the beat signal according to the presence or the absence of the interference; and
a detecting unit that detects information of the target based on the amplitude greater than the reference amplitude.

6. The radar according to claim 5, wherein the radar repeats scans of the transmission and reception signals in an azimuth direction, and wherein the reference amplitude is determined on the basis of the amplitude of the beat signal for a beam in the same direction used in a previous scan.

7. The radar according to claim 5, wherein the radar directs the transmission signal to a plurality of different directions and receives a reception signal for each beam, and wherein the reference amplitude is determined on the basis of the amplitude of the beat signal for a beam neighboring a focused beam.

8. The radar according to claim 5, wherein the reference amplitude is determined according to the beat signal in a neighboring modulation interval.

* * * * *